US012665747B2

(12) United States Patent
    Metcalf

(10) Patent No.: US 12,665,747 B2
(45) Date of Patent: Jun. 23, 2026

(54) SYSTEMS AND METHODS FOR AI DIRECTED TIERED POST QUANTUM PROTECTION OF MULTIMODAL DATA

(71) Applicant: University of Central Florida Research Foundation, Inc., Orlando, FL (US)

(72) Inventor: David Metcalf, Orlando, FL (US)

(73) Assignee: University of Central Florida Research Foundation, Inc., Orlando, FL (US)

( * ) Notice: Subject to any disclaimer, the term of this patent is extended or adjusted under 35 U.S.C. 154(b) by 0 days.

(21) Appl. No.: 19/366,133

(22) Filed: Oct. 22, 2025

(65) Prior Publication Data

US 2026/0149567 A1     May 28, 2026

Related U.S. Application Data

(60) Provisional application No. 63/725,284, filed on Nov. 26, 2024.

(51) Int. Cl.
    *H04L 9/08*        (2006.01)
    *H04L 9/40*        (2022.01)
(52) U.S. Cl.
    CPC ........ *H04L 9/0819* (2013.01); *H04L 63/0435* (2013.01)
(58) Field of Classification Search
    None
    See application file for complete search history.

(56)                References Cited

U.S. PATENT DOCUMENTS

| | | | |
|---|---|---|---|
| 2024/0298194 A1* | 9/2024 | Mueck ................. | G06N 20/00 |
| 2024/0354750 A1* | 10/2024 | Almasan ........... | G06Q 20/3823 |
| 2025/0133101 A1* | 4/2025 | Rao ..................... | H04L 63/1433 |
| 2025/0156576 A1* | 5/2025 | Song ................... | G06F 16/245 |
| 2025/0245537 A1* | 7/2025 | Kurian ................ | H04L 9/0852 |

* cited by examiner

*Primary Examiner* — Brandon Hoffman
(74) *Attorney, Agent, or Firm* — Anton J. Hopen; Trenam Law

(57)                ABSTRACT

Training an artificial intelligence model to categorize data by sensitivity and for applying the model to selectively protect sensitive portions of multimodal datasets. Sensitive training data can be obfuscated with synthetic noise or randomized errors to preserve confidentiality while enabling the model to learn patterns correlated with sensitivity. The trained model is validated on labeled data and can be refined as classification standards evolve. In operation, the classifier assigns sensitivity levels to data elements and directs tiered protection. Elements assigned to a higher relative sensitivity classification level are protected using post-quantum key establishment, for example a key encapsulation mechanism, combined with symmetric authenticated encryption of payloads, and associated metadata is authenticated using a post-quantum digital signature scheme. Less sensitive elements can be protected using conventional symmetric encryption for efficiency. This approach automates sensitivity classification, optimizes cryptographic resource allocation, and improves confidentiality and integrity for simulation and mission data.

20 Claims, 7 Drawing Sheets

SYSTEMS AND METHODS FOR AI DIRECTED TIERED POST QUANTUM PROTECTION OF MULTIMODAL DATA

PRIORITY CLAIM

This application claims priority to U.S. Provisional Patent Application No. 63/725,284 filed Nov. 26, 2024, entitled "Performant Quantum Resistant Tiered Encryption for Multimodal Data."

1. FIELD OF THE INVENTION

The described embodiments relate generally to data encryption and cybersecurity for secure data management in military and strategic applications. Specifically, the embodiments relate to systems and methods that apply quantum-resistant, tiered protection to selectively secure sensitive portions of multimodal datasets, such as those in military simulations and mission archives, using AI-driven data classification to allocate encryption resources efficiently.

BACKGROUND OF THE INVENTION

Current advancements in military data encryption have centered around protecting sensitive mission planning, training, and execution data through a combination of traditional cryptographic algorithms and secure blockchain systems. These methods ensure data integrity, confidentiality, and authenticity, vital for strategic military operations. Common encryption schemes such as RSA, AES, and ECC (Elliptic Curve Cryptography) have been foundational in securing mission-critical information. Additionally, blockchain technology has introduced a distributed, tamper-proof framework for archiving such data, enhancing resilience against data breaches and unauthorized modifications. However, while these systems provide substantial security within current paradigms, they remain susceptible to emerging threats posed by quantum computing.

The Cryptographic Foundations

RSA encryption, one of the most widely adopted asymmetric encryption algorithms, relies on the computational difficulty of factoring large prime numbers. It forms the basis for securing communications, authenticating identities, and safeguarding critical data. AES (Advanced Encryption Standard), a symmetric encryption algorithm, is efficient for encrypting bulk data but depends on shared secret keys. ECC offers similar benefits to RSA but with smaller key sizes, enabling faster encryption and decryption operations. Collectively, these algorithms contribute to multi-layered security architectures employed in military systems to protect operational data across various platforms.

Blockchain in Military Applications

In some embodiments, permissioned distributed ledger technology is deployed to support integrity, provenance, and access control for sensitive data. Permissioned architectures restrict participation to authorized organizations and personnel and can be configured with role-based permissions and policy-enforced workflows.

Implementations can be hosted in facilities compliant with applicable federal standards, and may use hardware security modules and multi-factor authentication to protect keys and administrative functions. Data in transit can be protected using Transport Layer Security and compatible secure protocols.

In certain deployments, ledger nodes interface with existing secure communication infrastructures and may be isolated from public networks. For high-classification environments, air-gapped or cross-domain-controlled configurations can be used.

Security operations can monitor ledger activity and apply anomaly detection. The ledger's verification functions are integrated with established cybersecurity controls to support secure handling of sensitive data.

Quantum Computing and Decryption Threats

Quantum computers present a paradigm shift in computational power, fundamentally altering the landscape of cryptographic security. Classical computers process information in bits, representing either a 0 or 1, while quantum computers use qubits, which leverage the principles of superposition and entanglement. This allows them to process a vast number of potential solutions simultaneously. Algorithms like Shor's algorithm exemplify the potential of quantum computers to disrupt encryption. Shor's algorithm efficiently factors large integers, undermining the security of RSA, which relies on the practical infeasibility of factoring such numbers with classical computation.

Impact on Traditional Cryptosystems

The implication of quantum capabilities is profound for military encryption. RSA, ECC, and similar cryptosystems can be broken in polynomial time by quantum computers, rendering their security guarantees obsolete. AES, while more resistant due to its symmetric nature, would require a doubling of key sizes (e.g., from 128-bit to 256-bit) to mitigate quantum attacks such as those based on Grover's algorithm. Although AES remains secure against quantum attacks to some extent, the increase in key length results in significant processing overhead, complicating its use in real-time military applications.

Vulnerabilities in Military Data Archives

Mission planning and execution data, archived in blockchain systems, also face potential risks. While the blockchain itself is protected through cryptographic hashing and consensus mechanisms, the encryption of data at rest or in transit could be compromised by quantum-enabled adversaries. The military relies on the assumption that encrypted data archived within secure ledgers will remain confidential until its designated declassification period. However, quantum computers threaten to accelerate decryption, enabling adversaries to access mission-sensitive information prematurely.

Challenges with Current Encryption Approaches

The existing framework for encryption often operates on a one-size-fits-all approach, applying uniform levels of encryption across entire data sets. This method fails to account for the differing sensitivity levels within a dataset. For example, mission training scenarios might involve public or low-sensitivity data mixed with highly confidential strategic details. Encrypting all data at the highest level incurs excessive processing costs and inefficiencies, particularly for large-scale simulations or data archives, without maximizing the value of computational resources.

SUMMARY OF THE INVENTION

In one aspect, methods are provided for training an artificial intelligence model to categorize data by sensitivity. The method includes: receiving a dataset comprising classified and publicly available data; obfuscating the classified data by injecting synthetic noise or randomized errors to form a modified training set; training the model on the modified training set and the publicly available data to identify structural patterns and markers indicative of data sensitivity; validating the model on a separate labeled dataset; and generating a sensitivity scoring model that outputs a numerical score s in a bounded range and maps s to an ordered set of relative sensitivity classification levels that includes at least a higher relative sensitivity classification level and a lower relative sensitivity classification level.

In another aspect, methods are provided for applying a trained sensitivity categorization model to simulation data. The method includes: receiving simulation data elements; processing the elements with the trained model to obtain the score s for each element and mapping each score to the ordered set of relative sensitivity classification levels; protecting the elements assigned to the higher relative sensitivity classification level using a post quantum confidentiality mechanism comprising establishing a content encryption key with a key encapsulation mechanism and encrypting payloads using symmetric authenticated encryption; and transmitting the protected data to secure storage. In certain embodiments, the selection of protections is monotone non-decreasing with respect to the relative sensitivity classification level such that an element at a higher relative sensitivity classification level receives protections that are at least as strong as protections applied to an element at a lower relative sensitivity classification level. Lower-level elements can be protected using a reduced-rigor mode that omits the post quantum key establishment and applies symmetric authenticated encryption. Integrity and authenticity can be provided by applying a post quantum digital signature scheme.

In a further aspect, methods are provided for applying the trained model to mission and training data. The method includes: retrieving mission or training data; assigning a sensitivity score and mapping the score to the ordered set of relative sensitivity classification levels; protecting elements assigned to the higher relative sensitivity classification level using the post quantum confidentiality mechanism described above; and storing the protected data in an access-controlled database. In representative embodiments, the ordered set includes at least three levels, where an intermediate level is protected using symmetric authenticated encryption with keys established by a classical key agreement.

Representative confidentiality mechanisms include a key encapsulation mechanism such as Kyber or a public key encryption scheme such as NTRUEncrypt for establishing or protecting content encryption keys, followed by symmetric authenticated encryption of payloads, for example AES 256 GCM. Representative digital signature schemes include CRYSTALS Dilithium, Falcon, and SPHINCS+. These techniques are directed by the AI driven classifier so that cryptographic resources are allocated according to the relative sensitivity classification level.

DETAILED DESCRIPTION

AI-Driven Data Classification

Figure 1:
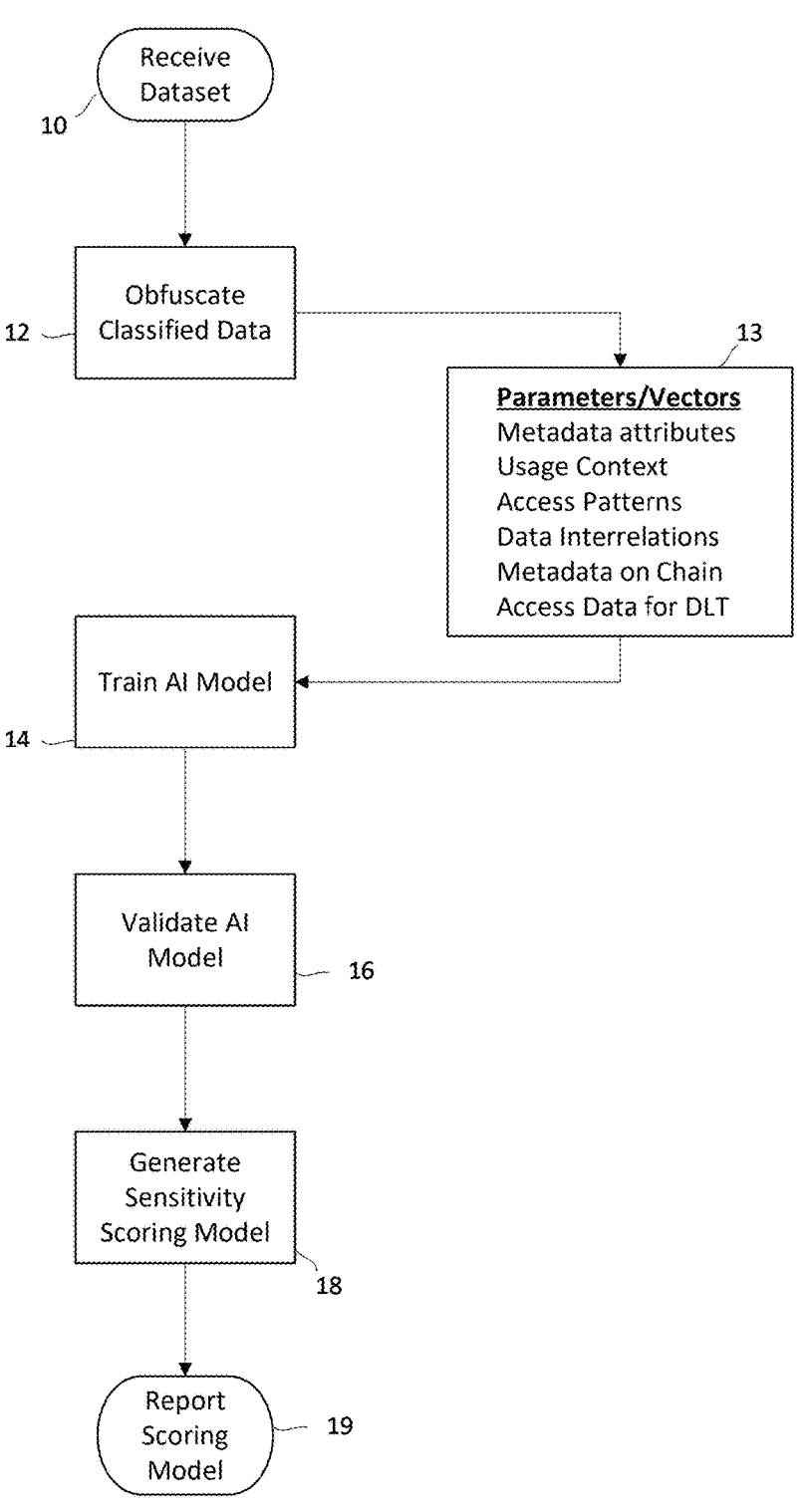
FIG. 1 is a flowchart of an embodiment for generating a classification model.

Central to the invention is an AI model trained to discern the sensitivity of various data elements. The model establishes a baseline by analyzing publicly known or low-classification data to determine attributes characteristic of non-sensitive information. This baseline enables the AI to classify data without requiring manual tagging or human intervention. For training purposes, highly confidential data is processed through randomized injections of noise or errors to obscure specific details, preserving its confidentiality while allowing the model to learn the structure and patterns associated with sensitive information.

Segmentation of Data for Encryption

The AI's classification outputs allow for intelligent segmentation of data into tiers of sensitivity. For instance, a military simulation might include common aircraft performance data, tactical plans, and communication logs. The AI model can differentiate between public knowledge, such as standard NATO aircraft specifications, and high-value targets like strategic mission blueprints. By segmenting the data, the system applies quantum-resistant encryption selectively, ensuring that the most computationally intensive algorithms are used only for the most critical components.

Quantum-Resistant Protocols

Post-quantum cryptography includes confidentiality mechanisms and digital signature schemes intended to remain secure against quantum-enabled adversaries. Examples include Kyber, which is a key encapsulation mechanism used to establish content-encryption keys, and NTRUEncrypt, which is a public-key encryption scheme for protecting payloads or session keys.

Digital signature schemes provide source authentication and data integrity. Examples include CRYSTALS-Dilithium and Falcon, which are lattice-based, and SPHINCS+, which is hash-based and relies on conservative assumptions.

In representative embodiments, confidentiality for high-sensitivity data is provided by deriving or protecting symmetric content-encryption keys using a key encapsulation mechanism, such as Kyber, or by directly encrypting with a public-key scheme, such as NTRUEncrypt, followed by symmetric authenticated encryption of the payload. Integrity and authenticity are provided by applying a post-quantum digital signature scheme, such as CRYSTALS-Dilithium, Falcon, or SPHINCS+.

Tier selection can consider sensitivity, performance, and storage or bandwidth constraints. Highly sensitive elements receive post-quantum key establishment with symmetric authenticated encryption and mandatory signing. Lower-sensitivity elements can use conventional symmetric encryption with larger keys and optional signatures, or a hybrid mode that combines classical and post-quantum methods.

5

Operational Example

Consider a combat simulation involving a wing commander's planning session. The AI model identifies high-confidentiality elements, such as mission routes, asset allocation plans, and communication strategies. These elements are protected by establishing content-encryption keys using a post-quantum key encapsulation mechanism, such as Kyber, or by encrypting with a public-key scheme, such as NTRUEncrypt. Associated records are digitally signed using a post-quantum signature scheme, such as CRYSTALS-Dilithium or Falcon. Elements that represent widely known data, such as basic aircraft specifications, can be protected using symmetric authenticated encryption, for example AES-256-GCM, without post-quantum key establishment when appropriate.

Real-World Data Application

Beyond simulations, the system can be applied to mission data obtained from operational aircraft. When flight data is transmitted to a secure repository, the classifier identifies confidential components, such as mission routes and communication logs, and applies post-quantum key establishment with symmetric authenticated encryption to those components. Less sensitive data, such as telemetry reflecting publicly known platform performance, can use conventional symmetric encryption to maintain efficiency.

Utility of the Approach

This invention mitigates the processing burden typically associated with uniform application of quantum-resistant encryption by focusing computational resources where they have the highest impact. The AI-driven classification enables a dynamic, scalable encryption strategy, improving both performance and security. Furthermore, the obfuscation technique used in training ensures that AI models are robust without exposing true confidential data, preventing potential leaks or misuse.

Integration with Existing Systems

The proposed system can be integrated with current blockchain and military data infrastructure to enhance the encryption protocol seamlessly. This ensures compatibility with legacy data formats and secure transfer protocols already in use. The AI model continuously learns and refines its classification capabilities, adapting to new data structures and evolving confidentiality requirements.

This invention addresses the limitations of traditional encryption systems by combining quantum-resistant encryption with AI-based data classification. This enables a tiered approach that prioritizes security while minimizing processing inefficiencies, crucial for the complex and data-heavy needs of modern military operations.

Contrasts with Bitcoin and Cryptocurrency Systems

While the invention described herein leverages advanced cryptographic methods and secure data architectures, it fundamentally diverges from the foundational principles of Bitcoin and other blockchain-based cryptocurrency systems. This divergence arises primarily from the contextual needs and goals of the invention, which emphasize controlled access, adaptability, and targeted data protection, contrasting sharply with the decentralized, public, and immutable nature of traditional cryptocurrency frameworks.

Public Vs. Controlled Access

Bitcoin, as a cryptocurrency system, operates on a public blockchain architecture, where any participant can access and verify transactions. This openness is a cornerstone of its trust model, relying on the collective validation of a decentralized network to ensure the integrity of the ledger without the need for centralized oversight. In stark contrast, the invention described here is explicitly designed for environments where data confidentiality is paramount. The architecture supports controlled access through mechanisms such as role-based permissions, multi-factor authentication, and hardware security modules (HSMs).

Sensitive data, particularly in domains like military, healthcare, and law enforcement, cannot be publicly accessible. Publicly exposing data-even in encrypted form-poses unacceptable risks, including the potential for adversarial actors to accumulate ciphertext and exploit future vulnerabilities or quantum computing advancements to decrypt it. Thus, this invention is inherently suited for secure, permissioned systems where only authorized users can access and process classified or sensitive information.

Immutability Vs. Adaptability

Bitcoin's blockchain achieves immutability through cryptographic hashing and consensus mechanisms such as proof-of-work. Once a transaction is recorded on the blockchain, it cannot be altered or deleted without re-mining the entire chain, a process rendered infeasible by its computational cost. This immutability is critical for establishing trust in a decentralized system where no central authority governs the ledger.

However, strict immutability may be unsuitable in contexts that require policy-driven corrections or evolving classification standards. For example, in military or healthcare systems, classification standards for data sensitivity may change over time, necessitating updates to data categorization or encryption protocols. Similarly, errors or misclassifications must be correctable to ensure accurate decision-making. The invention's architecture allows for such adaptability by incorporating AI-driven models that iteratively refine their classifications and by enabling data administrators to update or reclassify records as needed.

This controlled mutability is further critical in ensuring compliance with data protection regulations, such as the European Union's General Data Protection Regulation (GDPR), which mandates that individuals have the right to request corrections or deletions of their data. Immutable systems like Bitcoin cannot accommodate such requirements without compromising their foundational design principles.

Decentralization Vs. Centralized Oversight

Bitcoin's decentralized model eliminates the need for a trusted central authority, relying instead on distributed nodes to validate transactions and maintain the ledger. While decentralization enhances resilience against single points of failure and promotes inclusivity, it introduces inefficiencies and vulnerabilities that are incompatible with the requirements of this invention.

In environments such as healthcare or defense, centralized oversight is necessary to ensure accountability, enforce compliance with security policies, and facilitate rapid decision-making. For instance, in a law enforcement scenario, the chain of custody for evidence must be meticulously tracked and managed by authorized personnel. A decentralized model could compromise this oversight, as it lacks mechanisms to enforce hierarchical access controls or to revoke access when personnel roles change.

The invention employs a centralized or permissioned model, which supports granular access controls, auditing capabilities, and the ability to respond dynamically to emerging threats or operational requirements. This centralized governance enables the system to balance security with efficiency, ensuring that sensitive data is accessible only to those with a legitimate need while providing the flexibility to adapt as conditions evolve.

Resource Optimization Vs. Uniformity

Bitcoin and other cryptocurrency systems apply uniform cryptographic protection to all transactions regardless of their content or importance. Every block is secured using the same cryptographic algorithm, and the proof-of-work mechanism ensures that all transactions are treated equally in terms of computational effort. While this uniformity is essential for maintaining fairness and simplicity in a decentralized network, it is inefficient for scenarios where data sensitivity varies significantly.

The invention addresses this inefficiency by employing a tiered encryption strategy guided by AI-driven sensitivity classification. Data elements are categorized into tiers based on their confidentiality and operational importance, allowing the system to selectively apply the most resource-intensive quantum-resistant protocols to only the most critical data. This targeted approach not only reduces computational overhead but also ensures that encryption resources are allocated where they are most needed, a consideration that is particularly vital in environments with constrained processing power or bandwidth.

Transparency Vs. Confidentiality

Transparency is a hallmark of Bitcoin's design, with all transactions visible on the public ledger. This transparency fosters trust and accountability in a system where participants may be anonymous and have no prior relationships. However, transparency is antithetical to the requirements of sectors like defense, healthcare, or law enforcement, where data confidentiality is often more important than public verifiability.

For example, a military simulation involving strategic mission planning cannot risk exposure of sensitive operational details, even to internal personnel who are not directly involved. Similarly, in healthcare, patient data must remain confidential to comply with privacy laws such as HIPAA. The invention ensures confidentiality through robust encryption and access control mechanisms, with visibility strictly limited to authorized users. Transparency, when required, is achieved through auditable logs that record access and modifications without exposing sensitive data itself.

Scalability Vs. Security Trade-Offs

Bitcoin's blockchain is intentionally designed to scale horizontally by adding more nodes to the network. However, this scalability comes at the cost of transaction throughput and latency, as every node must process and validate each transaction. In contrast, the invention prioritizes security and real-time performance, often at the expense of scalability in the traditional blockchain sense.

By leveraging a permissioned model, the system can achieve higher transaction speeds and lower latency compared to Bitcoin's public blockchain. Moreover, the incorporation of quantum-resistant cryptographic protocols ensures that the system remains secure against future threats, a level of protection that Bitcoin's current cryptographic foundations (e.g., SHA-256) cannot guarantee.

The Role of AI in Data Management

Bitcoin's architecture is designed to be deterministic and stateless, relying solely on cryptographic rules and network consensus to validate transactions. In contrast, the invention integrates AI to dynamically classify data, optimize encryption strategies, and adapt to evolving classification standards. This use of AI introduces a level of intelligence and flexibility that is absent in Bitcoin's rigid design.

For instance, the AI model in the invention can identify patterns of sensitivity within multimodal datasets, enabling the system to differentiate between low-sensitivity and high-sensitivity data. Such granularity would be infeasible in a system like Bitcoin, which treats all transactions as equal. By incorporating AI, the invention can prioritize the protection of critical data while optimizing resource usage, a capability that is essential for mission-critical applications.

FIG. 1 illustrates a computer-implemented method of training an artificial intelligence (AI) model to categorize data based on sensitivity levels. The process begins with 10, where a dataset comprising classified and publicly available data is received. In 12, classified data is obfuscated by injecting synthetic noise or randomized errors. This step alters specific details while preserving the overall structure of the classified data, ensuring that its confidentiality is maintained during the training process.

In 13, extrinsic parameters and vectors are incorporated to identify sensitivity characteristics independent of the classified data's content. These parameters may include metadata attributes such as timestamps and access history, usage contexts such as operational scenarios, access patterns like user activity, and interrelations between datasets. These vectors allow the AI model to infer patterns indicative of sensitivity without relying on the actual content of the classified data.

The obfuscated data, combined with publicly available data and the extrinsic parameters from 13, is utilized in 14 to train the AI model. During this training step, the model is configured to identify structural patterns and markers associated with data sensitivity. The model's performance is validated in 16 using a separate test dataset with known classifications. This step evaluates the model's accuracy and reliability, applying validation techniques such as k-fold cross-validation or other iterative validation methods to ensure robustness.

After validation, 18 involves generating a sensitivity scoring model configured to output a sensitivity score and to map the score to an ordered set of relative sensitivity classification levels that includes at least a higher relative sensitivity classification level and a lower relative sensitivity classification level. The model applies the patterns and characteristics learned during training to assign sensitivity scores to data elements. The process concludes with 19, where the sensitivity scoring model is reported for use in downstream applications.

FIG. 1 represents a method that incorporates non-content-based attributes for sensitivity classification, maintaining data confidentiality during AI training while facilitating accurate categorization of data sensitivity.

Figure 2:
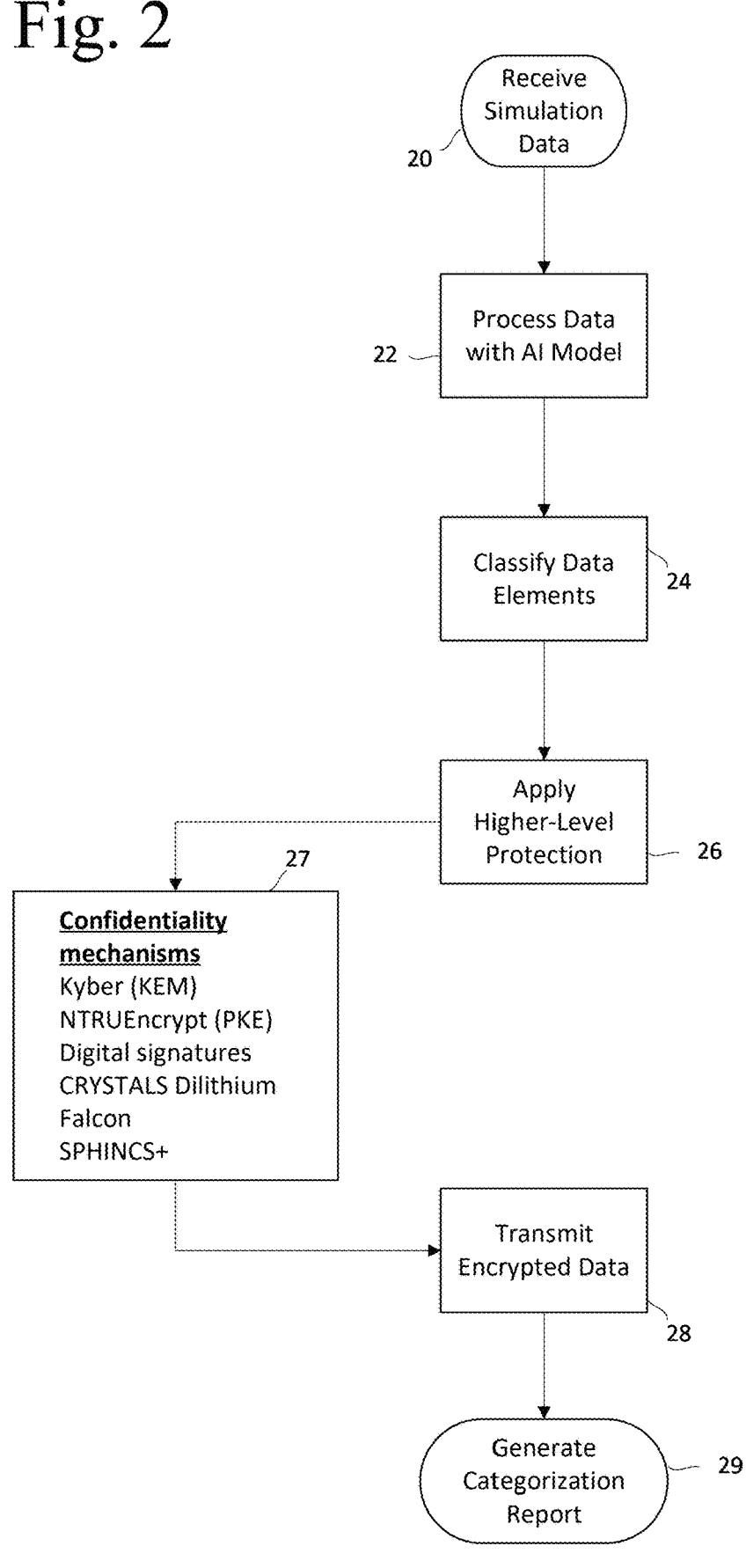
FIG. 2 is a flowchart of an embodiment applying the classification model to a simulation.

FIG. 2 illustrates the application of the sensitivity categorization model to military simulations. In 20, data elements from a military simulation are received, including operational scenarios, equipment specifications, and related data. In 22, these data elements are processed using the trained sensitivity categorization model to determine their sensitivity levels.

In 24, the data is classified by mapping each element's score to the ordered set of relative sensitivity classification levels. For elements assigned to a higher relative sensitivity classification level, step 26 applies a post-quantum confidentiality mechanism, for example using Kyber to establish content-encryption keys combined with symmetric authenticated encryption of payloads, or using NTRUEncrypt to protect keys or payloads. Integrity and authenticity can be provided by applying a digital signature scheme, such as CRYSTALS-Dilithium, Falcon, or SPHINCS+.

A branch 27 connects algorithm selection to protection steps. This highlights flexibility in applying techniques based on operational requirements or sensitivity levels. In

28, the protected data is transmitted to secure storage. In 29, a report logs categorized elements and their protection status for audit.

FIG. 2 demonstrates a method for integrating sensitivity categorization with encryption protocols, optimizing the allocation of computational resources while ensuring the security of highly sensitive data within military simulations.

Figure 3:
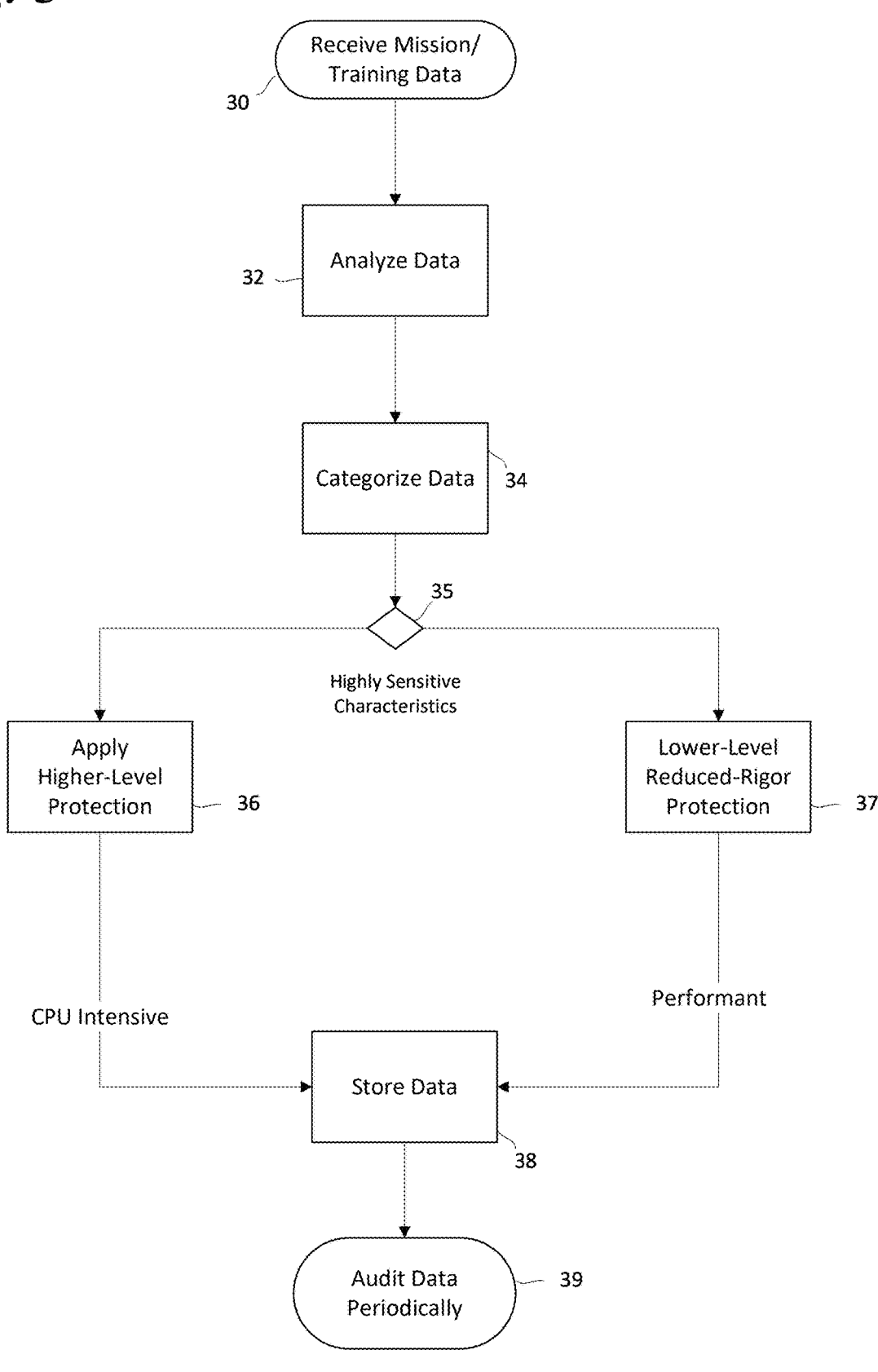
FIG. 3 is a flowchart of an embodiment applying the classification model to training or mission data prior to archiving.

FIG. 3 illustrates the application of the sensitivity categorization model to mission and training data of military personnel. In 30, mission or training data is retrieved from associated systems. In 32, the retrieved data is analyzed using the sensitivity categorization model to identify elements requiring high confidentiality.

The data is categorized in 34 by mapping each element's score to the ordered set of relative sensitivity classification levels. A decision is made in 35. Elements assigned to a higher relative sensitivity classification level are processed in 36 by applying higher-level protection comprising post-quantum key establishment with symmetric authenticated encryption. Elements assigned to a lower relative sensitivity classification level are processed in 37 by applying lower-level reduced-rigor protection that omits post-quantum key establishment and applies symmetric authenticated encryption.

The processed data, whether encrypted or not, is stored in 38 in a secured, access-controlled database. Periodic auditing of the stored data is performed in 39 to ensure adherence to evolving classification standards and to maintain the system's operational integrity. FIG. 3 illustrates a method for applying sensitivity categorization to mission and training data, enabling secure storage and efficient resource management while accommodating real-time data updates and classification refinements.

Figure 4:
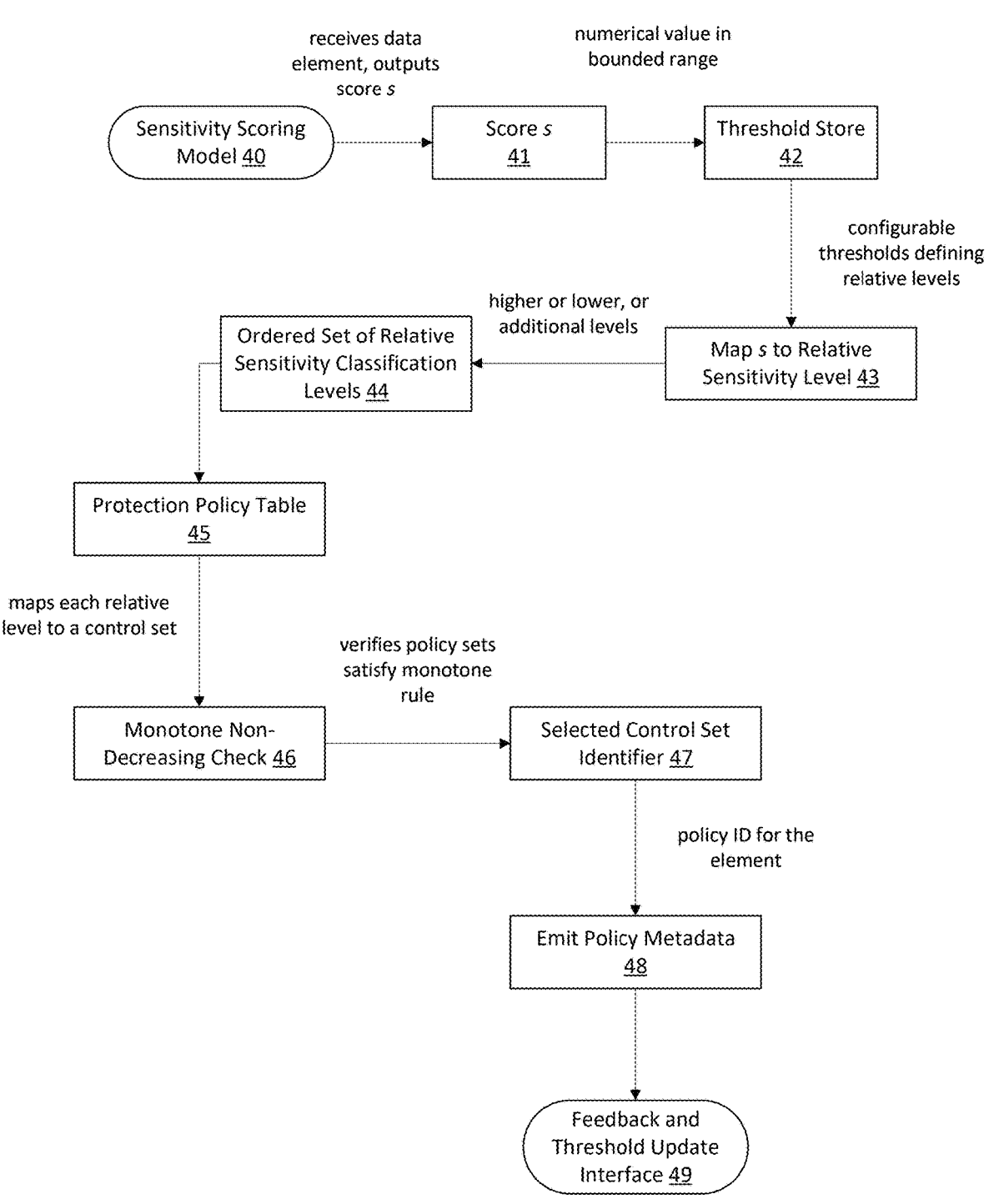
FIG. 4 is a flowchart of an embodiment that maps a sensitivity score to an ordered set of relative sensitivity classification levels and selects a protection policy, including a monotone non-decreasing check.

FIG. 4 illustrates mapping a sensitivity score to a relative level and selecting a corresponding protection policy. At 40, a sensitivity scoring model processes a data element and outputs a numerical score, s at 41. A threshold store 42 holds configurable thresholds that partition the range of s into an ordered set of relative sensitivity classification levels, represented at 44. At 43, the system maps s to a level using the thresholds. A protection policy table 45 maps each relative level to a set of protections. A monotone non-decreasing check 46 verifies that the protection sets defined in the table are at least as strong when the relative level is higher, thereby enforcing the monotone property. If the check passes, a selected control set identifier is emitted at 47 with policy metadata at 48. An administrative or automated tuning interface 49 can update thresholds 42 under policy control.

Figure 5:
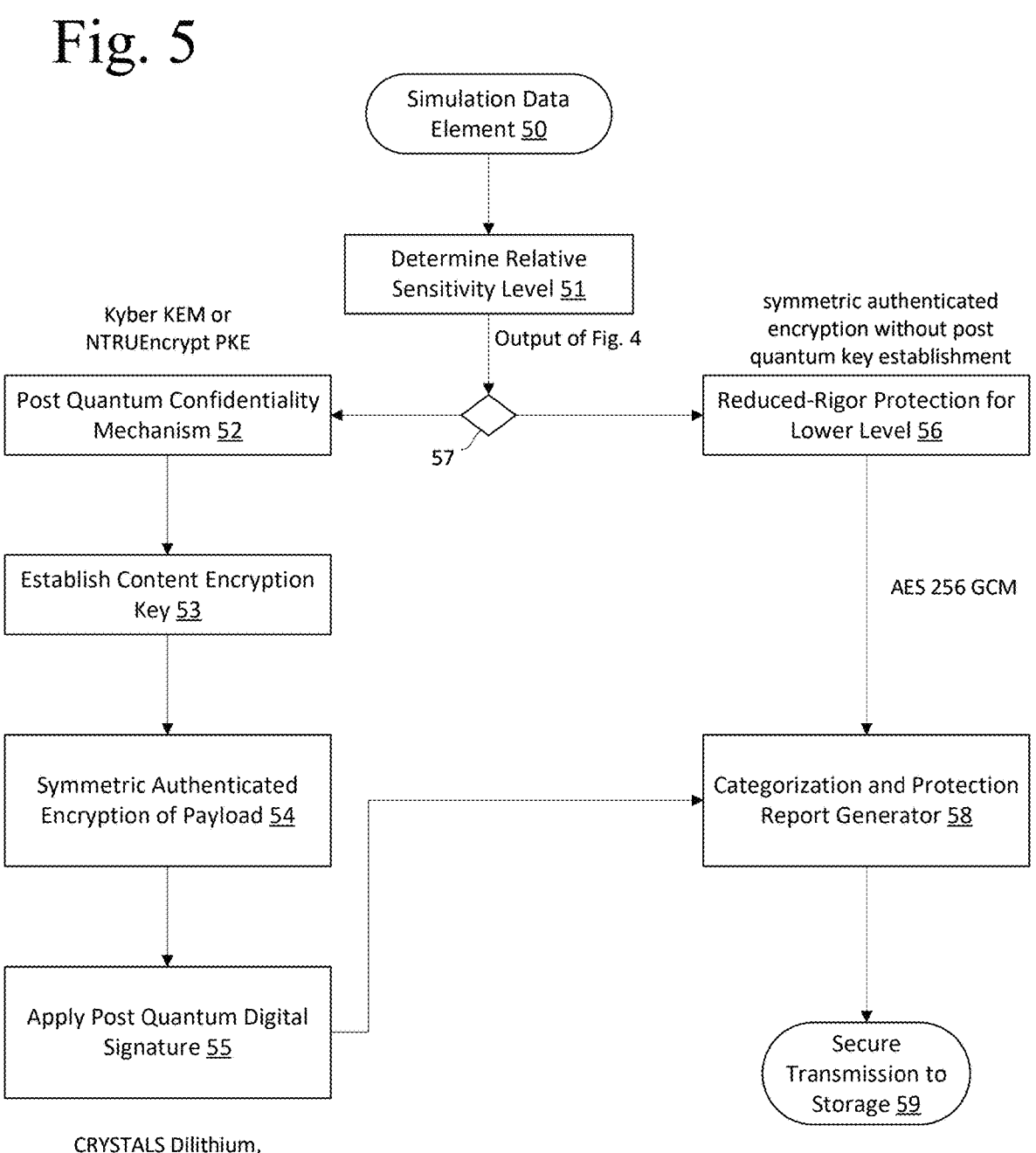
FIG. 5 is a flowchart of an embodiment that applies protections to simulation data based on the relative sensitivity classification level, including a post quantum key establishment path with authenticated encryption and a reduced-rigor path.

FIG. 5 illustrates applying protections to simulation data according to the selected level. A simulation data element is received at 50. The level is determined at 51, which may use the output of FIG. 4. A protection path selector 57 routes higher-level elements to a post quantum confidentiality path that includes selecting a confidentiality mechanism at 52, establishing a content encryption key at 53, and applying symmetric authenticated encryption at 54. A post quantum digital signature is applied at 55 for integrity and authenticity. Elements at a lower relative sensitivity classification level follow a reduced-rigor path at 56 that applies symmetric authenticated encryption without post quantum key establishment. Protected elements are transmitted to storage at 59, and a categorization and protection report is generated at 58.

Figure 6:
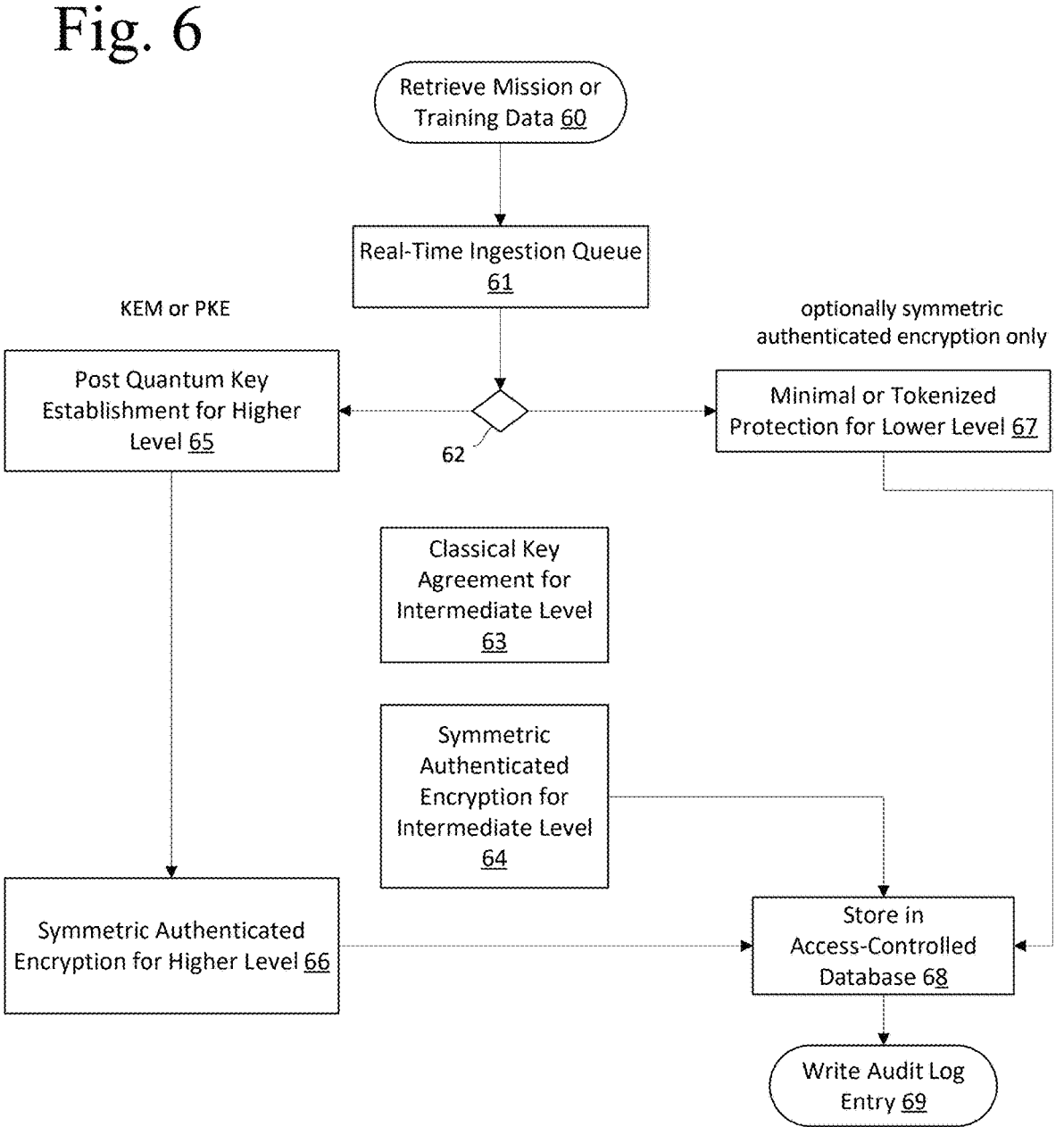
FIG. 6 is a flowchart of an embodiment that applies protections to mission or training data using three relative sensitivity classification levels, where an intermediate level uses classical key agreement with symmetric authenticated encryption.

FIG. 6 illustrates application to mission or training data using three relative sensitivity classification levels. Mission or training data is retrieved at 60 and optionally buffered in a real-time ingestion queue at 61. Scoring and level assignment occur at 62. Lower-level elements receive minimal or tokenized protection at 67. Intermediate-level elements use classical key agreement at 63 and symmetric authenticated encryption at 64. Higher-level elements use post quantum key establishment at 65 and symmetric authenticated encryption at 66. Results are stored in an access-controlled database at 68 with an audit log entry at 69.

Figure 7:
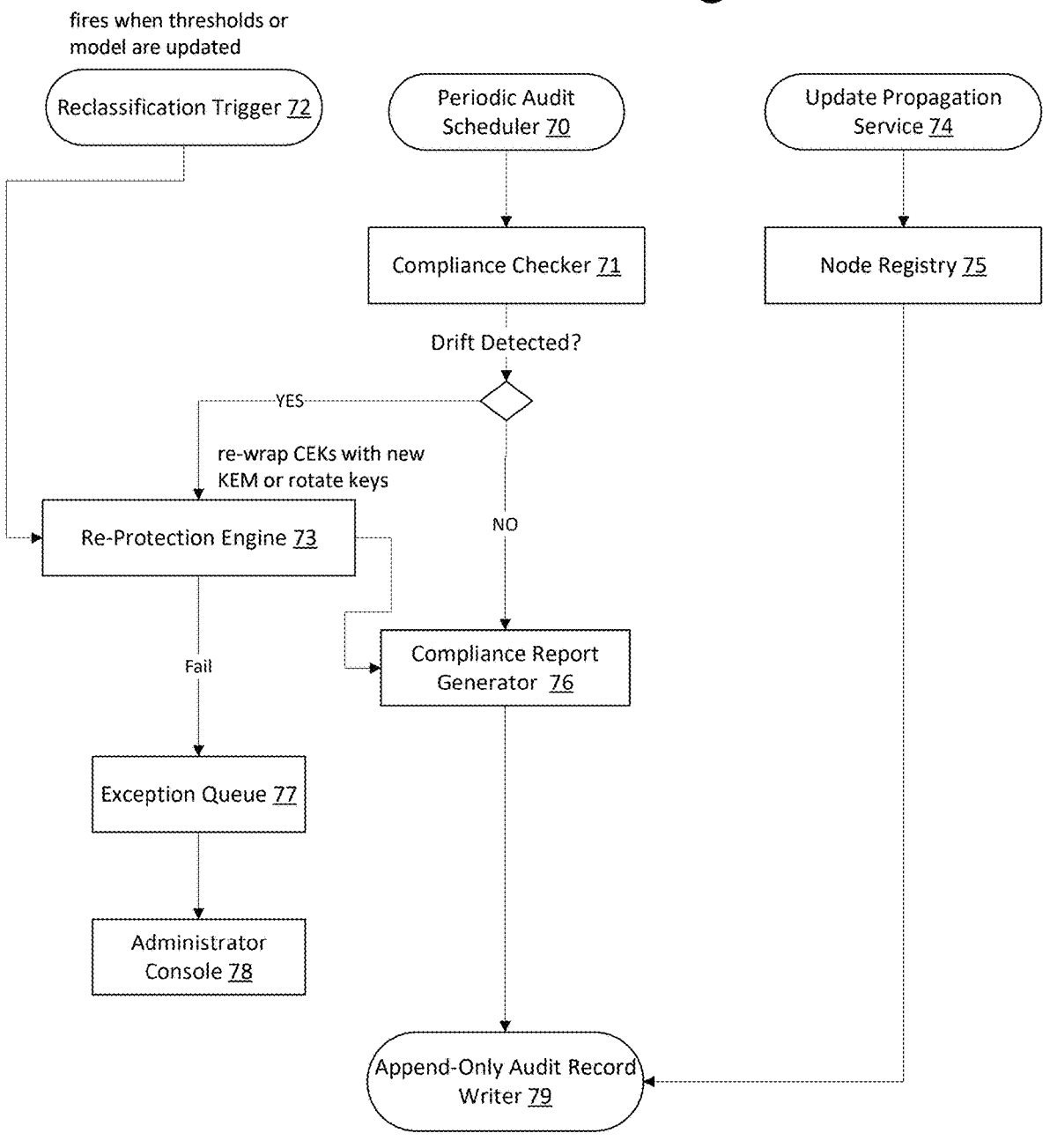
FIG. 7 is a flowchart of an embodiment that performs auditing, reclassification, re-protection, and propagation of model and threshold updates across participating systems.

FIG. 7 illustrates auditing and update propagation. A periodic audit scheduler 70 invokes a compliance checker 71 that verifies the protections for stored elements and confirms the monotone rule. A reclassification trigger 72 activates when a sensitivity model or threshold update occurs. If an element requires stronger protection under the updated policy, a re-protection engine 73 rotates or re-wraps keys and re-encrypts as needed. An update propagation service 74 distributes new models and thresholds to nodes listed in a node registry 75. A compliance report is generated at 76, and audit records are written at 79. Items that cannot be re-protected are queued at 77 for administrative resolution in console 78.

Computer and Software Technology

The present invention may be embodied on various platforms. The following provides an antecedent basis for the information technology that may be utilized to enable the invention.

Embodiments of the present invention may be implemented through the integration of display systems and simulation technologies to create real-time, data-driven virtual environments. The invention involves hardware, firmware, and software elements that work together to process, visualize, and securely handle complex data. The combination of these elements supports applications such as military training and mission planning, where large-scale data visualization and interaction are critical.

The hardware component can include autostereoscopic or light-field display devices that project three-dimensional content and provide depth perception without specialized eyewear. Such displays can aid operational planning by visualizing spatial relationships. Integration with haptic devices allows users to interact with virtual objects and receive tactile feedback.

Additional hardware may include biometric input devices that provide user authentication and track physical responses during simulation. This hardware can ensure that access to sensitive simulation content is restricted to authorized personnel. These input devices may include fingerprint scanners, facial recognition cameras, or voice authentication systems integrated into the simulation platform.

The invention operates on classical computing platforms. Cryptographic functions are executed on general-purpose processors or accelerators, and may use hardware security modules for key protection. Post-quantum cryptography is designed for classical execution while providing security against adversaries with quantum capabilities. Representative integrations include CRYSTALS-Dilithium and Kyber, which rely on hard mathematical problems believed to resist known quantum attacks.

The invention also encompasses machine-readable storage media used to store simulation data, instructions, and encryption keys. These media can include non-volatile storage solutions such as solid-state drives, secure ROMs, or quantum-resistant blockchain storage systems. These storage solutions provide a secure repository for sensitive data and support the rapid access and retrieval needed for real-time simulations. The system can interface with cloud-based or on-premise storage providers, including platforms such as Microsoft Azure and Amazon Web Services, to extend its data handling capabilities while maintaining secure data transfer protocols.

The firmware and software layers control the execution of various routines and algorithms. The software may be written in programming languages suited for high-performance computing, such as (preferably memory-safe) C#, and Python, and incorporate object-oriented design for modularity. Software modules handle tasks such as 3D rendering, AI-driven data processing, encryption, and communication with external systems. These modules can execute instructions related to data input, processing, display, and user interaction.

The firmware embedded within the hardware components facilitates real-time communication between the devices and the processing units. This firmware supports functions such as synchronizing holographic projections with user inputs and executing AI algorithms that manage data classification and processing. The AI component plays a role in assessing data sensitivity, using models trained on obfuscated datasets that simulate classified information. By analyzing data structures and patterns, the AI can identify which parts of a simulation require heightened security measures. This helps prioritize the application of quantum-resistant encryption to the most sensitive data segments.

Haptic devices, such as feedback gloves, are included to enable user interaction with virtual objects. These gloves contain actuators that respond to digital commands, simulating the sense of touch. Haptic feedback allows users to experience physical interactions in the simulation, such as manipulating virtual controls or feeling the texture of digital surfaces. This interaction adds depth to training scenarios, providing users with a more realistic experience.

Secure data transmission within the platform is facilitated by cryptographic protocols such as Transport Layer Security (TLS). TLS ensures that data transmitted between components, such as the processor and display system, is encrypted and protected against interception. The platform may employ a permissioned distributed ledger to log interactions and modifications, creating an append-only, auditable record. Administrative controls can support policy-based redaction or versioned corrections when required. Post-quantum protections can be applied to keys and signatures associated with ledger entries.

The machine-readable medium utilized by the invention can include any mechanism that stores instructions or data in a form accessible by processors. Examples include flash memory devices, magnetic disks, and optical storage media. The platform supports both local and cloud-based storage, providing flexibility in data management and backup. The storage medium may be designed with redundant and distributed systems to ensure data availability and integrity, even if part of the system is compromised.

Software routines executed by the platform include data encryption, rendering algorithms, and interaction handlers. These routines allow the system to respond to user inputs, render 3D models on the holographic table, and adjust simulations based on user interactions. The encryption routines use quantum-resistant algorithms to secure data before it is transmitted or stored, ensuring that only authorized users can access and modify the simulation content.

The invention's platform may also include AI middleware capable of processing natural language commands and generating simulation scenarios. This middleware relies on Large Language Models (LLMs) trained to interpret user inputs and convert them into executable instructions within the simulation. The AI can manage dynamic content generation, scenario adjustments, and predictive analytics that inform users of potential outcomes based on current simulation parameters.

Integrating all components can use a scalable enterprise software architecture with a plug-and-play framework that supports high throughput, parallel processing, and iterative integration of new tools. The framework connects diverse devices, including display systems and multimodal interfaces such as head-mounted or eyewear-style devices that support visual, gestural, and voice input.

The plug-and-play design ensures compatibility with post-quantum mechanisms, including key-establishment mechanisms such as Kyber and digital signature schemes such as CRYSTALS-Dilithium and Falcon, allowing the system to leverage best-of-breed quantum-resistant ciphers. Similarly, modular integration of 3D technologies, such as holographic projection tables and autostereoscopic displays, provides immersive visualization and interaction for complex data analysis and simulation scenarios. AI systems are incorporated as configurable modules, enabling real-time data processing and adaptive learning, while the architecture supports multimodal input methods ranging from traditional peripherals to advanced wearable interfaces like the Ray-Ban MetaView glasses. These glasses offer hands-free functionality with integrated AI-driven insights, augmented overlays, and robust compatibility with enterprise platforms.

The architecture's extensibility allows seamless upgrades to include future technologies, such as augmented reality interfaces and IoT-enabled tools, enhancing system versatility. Data flow management and security protocols ensure real-time performance while maintaining rigorous data protection standards. This adaptive and scalable framework empowers organizations to iteratively integrate evolving technologies, maintain interoperability across platforms, and optimize system performance for diverse operational needs.

Aspects of the present invention are further described with reference to flowchart illustrations and/or block diagrams of methods, apparatus (systems), and computer program products according to embodiments of the invention. Each block of the flowcharts or diagrams, as well as combinations thereof, can be implemented via machine-readable program instructions within this modular architecture, ensuring the efficient execution of tasks and compatibility with emerging technologies.

Glossary of Claim Terms

AES (Advanced Encryption Standard) means a symmetric block cipher standardized by NIST in 2001. AES uses a 128-bit block and supports 128-, 192-, and 256-bit keys with 10, 12, or 14 rounds, respectively. A single secret key is used for encryption and decryption, and AES performs efficiently in software and hardware. Against quantum adversaries, Grover's algorithm provides a quadratic speedup for brute-force key search, which effectively halves the security level expressed in bits. Accordingly, AES-256 is preferred in post-quantum contexts.

Artificial Intelligence (AI) means the field of computer science focused on the development of systems capable of performing tasks that typically require human intelligence. These tasks include pattern recognition, decision-making, natural language understanding, and learning. AI systems are constructed using various methodologies such as machine learning, where models are trained on data to make predictions or classifications, and deep learning, which uses neural networks with multiple layers to improve performance on complex tasks. In simulation and training environments, AI enhances real-time decision-making by analyzing data, generating responses, and adapting to new information. AI models can be supervised, unsupervised, or use reinforcement learning to iteratively improve their capabilities. The integration of AI in military and enterprise applications involves automated data processing, adaptive simulations, and predictive analysis, supporting efficient operations and training protocols.

Autostereoscopic means a display technology that allows for the perception of 3D images without the need for specialized eyewear. This is achieved by directing different images to each eye using methods such as parallax barriers or lenticular lenses, creating a sense of depth. In simulation environments, autostereoscopic displays enable multiple users to view 3D content simultaneously from different angles, facilitating collaborative interactions and enhanced visualization. These displays work by aligning the light rays emitted from the screen so that different images reach the viewer's eyes depending on their position relative to the display. This technology is used in training and simulation systems where depth perception is crucial, such as military planning and visualization exercises, enabling more immersive and interactive experiences.

Blockchain means a distributed ledger technology that securely records transactions in a chronological chain of blocks across multiple nodes. Each block contains a cryptographic hash of the previous block, transaction data, and a timestamp, ensuring that the recorded data is immutable and tamper-resistant. Blockchain operates on consensus algorithms, such as proof of work or proof of stake, that require agreement from network participants for new transactions to be validated. In military and secure enterprise contexts, blockchain technology is used for maintaining records of mission-critical data, training logs, and operational plans. Its decentralized nature ensures data integrity and traceability without relying on a central authority, making it suitable for environments where trust and security are paramount. The use of blockchain can be combined with cryptographic techniques, such as post-quantum algorithms, to provide enhanced security against potential quantum computing threats.

CRYSTALS-Dilithium means a lattice-based cryptographic scheme used for digital signatures and part of the Cryptographic Suite for Algebraic Lattices (CRYSTALS). It is designed to provide security resistant to quantum attacks by relying on the hardness of the Learning With Errors (LWE) problem. The algorithm generates compact digital signatures that can be verified efficiently, making it useful for applications requiring both security and performance, such as secure communication in military and simulation systems. The underlying lattice problem ensures that the signatures remain secure even against quantum algorithms, such as Shor's algorithm, which can compromise traditional public-key cryptosystems. CRYSTALS-Dilithium's security is based on well-defined mathematical structures, making it a candidate for post-quantum cryptographic standards and suitable for environments that require long-term data protection.

Cybersecurity means the practice and field dedicated to protecting systems, networks, and data from unauthorized access, damage, or theft. This involves implementing security protocols, such as encryption, firewalls, and intrusion detection systems, and developing strategies to mitigate potential threats. Cybersecurity also encompasses practices like vulnerability assessments, risk management, and incident response to maintain the confidentiality, integrity, and availability of data. In military and enterprise systems, cybersecurity measures include quantum-resistant cryptographic protocols to safeguard sensitive data against emerging threats, such as quantum decryption capabilities. Advanced cybersecurity frameworks integrate AI to monitor network traffic and detect anomalies, ensuring real-time protection against sophisticated cyber-attacks.

Digital ledger technology (DLT) means a decentralized method of recording, storing, and managing data across a distributed network of computers. Unlike traditional centralized databases, DLT ensures that each participant in the network, known as a node, maintains a synchronized copy of the ledger. Changes to the ledger are verified through consensus mechanisms, such as proof of work, proof of stake, or Byzantine fault tolerance, which ensure the integrity and immutability of the data. DLT leverages cryptographic algorithms to secure transactions and prevent unauthorized tampering. Each record or transaction is bundled into a "block," cryptographically linked to the previous block, forming a chain-like structure. This feature ensures the chronological and tamper-proof nature of the ledger, enabling traceability and transparency while maintaining robust security against unauthorized modifications. In military and secure enterprise applications, DLT can be deployed within permissioned environments to maintain strict access control, where only vetted participants can contribute or view data. This ensures compliance with operational confidentiality and security protocols. Additionally, DLT supports the integration of advanced cryptographic measures, such as quantum-resistant protocols, to future-proof data security against emerging computational threats. DLT finds applications in secure communication systems, mission-critical data storage, supply chain management, and training data logging. Its decentralized architecture eliminates single points of failure, enhances data integrity, and facilitates auditable records, making it particularly suitable for high-security environments.

Digital twin means a virtual representation of a physical object, system, or process that is continuously updated with real-time data and simulations. It allows for monitoring, analysis, and predictive modeling to optimize performance and make informed decisions. In military training and operations, digital twins are used to simulate real-world conditions and scenarios, providing a dynamic platform for planning and rehearsing missions. These models incorporate data from sensors, IoT devices, and historical performance to create a comprehensive digital counterpart. The integration of AI enhances the predictive capabilities of digital twins, enabling adaptive responses to changing conditions and supporting situational awareness and decision-making processes.

ECC (Elliptic Curve Cryptography) means an asymmetric cryptographic method that uses elliptic curves over finite fields to secure data. ECC provides equivalent security to traditional public-key algorithms, like RSA, but with smaller key sizes, enabling faster computation and reduced storage requirements. This efficiency makes ECC suitable for environments with limited computational resources. However, ECC is vulnerable to quantum computing attacks, as algorithms such as Shor's can efficiently solve its underlying discrete logarithm problem. In the context of this invention, quantum-resistant alternatives are necessary to ensure the long-term security of data and communications in military and training systems.

Enterprise software architecture means the structural design that supports the development, integration, and management of software solutions in complex organizational environments. This architecture ensures that multiple systems and applications can interact seamlessly, maintaining data flow, consistency, and security. In simulation and training platforms, enterprise software architecture facilitates the integration of AI, blockchain, and cryptographic protocols, allowing for scalable and secure operations. It includes frameworks for data processing, user authentication, and real-time updates, supporting collaborative and efficient training environments. This architecture must be robust enough to handle diverse data sources and interaction models, ensuring that operational needs are met without compromising system performance or security.

Haptics means the study and application of technology that simulates the sense of touch through mechanical or electrical feedback. Haptic technology involves actuators and sensors to create physical sensations, enabling users to perceive and interact with virtual objects as if they were tangible. In training and simulation environments, haptics enhances user experience by providing feedback that replicates real-world interactions, such as pressing buttons, manipulating equipment, or experiencing force feedback. This technology is integral to applications requiring hands-on training and tactile immersion, where users benefit from feeling the resistance, texture, or impact in simulated tasks.

Hardware security modules (HSMs) mean physical devices designed to securely generate, manage, and store cryptographic keys. HSMs provide dedicated hardware-based security, performing encryption, decryption, and key management tasks isolated from general computing processes to minimize vulnerabilities. In military and secure training environments, HSMs ensure that sensitive cryptographic material is protected from unauthorized access and cyber threats. They also facilitate the execution of cryptographic operations within a controlled, tamper-resistant environment, ensuring compliance with security policies and standards.

Holography means a photographic technique that records the light scattered from an object and displays it in three dimensions. Holography works by capturing both the intensity and phase of light waves, creating a true three-dimensional image. In simulation and training systems, holography is used to create immersive displays that allow users to view and interact with 3D visualizations without the need for specialized glasses. This enhances the realism of training environments, enabling users to experience depth perception and spatial awareness crucial for decision-making and operational planning.

Internet of Things (IoT) means a network of interconnected devices that communicate and exchange data with each other over the internet or private networks. These devices range from sensors and cameras to more complex systems like automated controls. In training and simulation environments, IoT provides real-time data inputs that can be integrated into digital twins and other models to enhance situational awareness. The data collected by IoT devices can be used to adapt simulations, monitor conditions, and provide detailed insights into operational performance, allowing for more accurate and responsive training experiences.

Kyber means a quantum-resistant key encapsulation mechanism used for secure key exchange in cryptographic protocols. Part of the CRYSTALS suite, Kyber is built on the hardness of the Module Learning With Errors (Module-LWE) problem. It provides a mechanism for establishing secure communication channels in environments that may be susceptible to quantum decryption. Kyber's design supports efficient key generation, encapsulation, and decapsulation, making it suitable for real-time applications requiring secure data exchange, such as military simulations and secure training platforms.

Large Language Model (LLM) means an advanced AI model trained on large datasets to understand, interpret, and generate human-like language. LLMs are capable of processing natural language queries, generating detailed responses, and performing complex language-based tasks. In simulation and training systems, LLMs facilitate human-computer interaction by interpreting voice commands, generating simulation scenarios, and providing contextual information. Their integration into training platforms enhances adaptability and user experience by supporting real-time content generation and scenario adjustments.

Learning With Errors (LWE) means a mathematical problem used in lattice-based cryptography. The LWE problem involves finding solutions to linear equations that have been perturbed with a small, random error. This problem is computationally hard for both classical and quantum computers, making it a foundation for constructing quantum-resistant cryptographic protocols. LWE is used in systems such as CRYSTALS-Dilithium and Kyber, ensuring that data remains secure even in the presence of quantum computing advancements that could break traditional encryption.

Module-LWE (Module Learning With Errors) means an extension of the LWE problem that supports cryptographic protocols in post-quantum cryptography. Module-LWE is applied to create key encapsulation mechanisms and other cryptographic functions that are resistant to quantum attacks. The use of modular structures allows for scalable and efficient implementations suitable for secure communications in large-scale systems. In military and training simulations, Module-LWE ensures data encryption remains robust against future quantum decryption techniques.

Module-SIS (Module Short Integer Solution) means a lattice-based problem similar to the Short Integer Solution (SIS) problem but adapted to modular arithmetic. Module-SIS forms the basis for certain post-quantum cryptographic algorithms, contributing to their resistance to quantum attacks. The problem involves finding short solutions to equations in a modular setting, which is computationally infeasible for both classical and quantum computers. This makes it a critical component in encryption schemes for secure communication and data protection in military and enterprise applications.

Monotone non-decreasing means a property of the protection-selection function that maps a relative sensitivity classification level to a set of protections, where moving from a lower relative sensitivity classification level to a higher relative sensitivity classification level never reduces protection strength. For any two levels $L_{low}$ and $L_{high}$ where $L_{high}$ is higher than $L_{low}$, the set of protections selected for $L_{high}$ is the same as or a superset of the protections selected for $L_{low}$.

Multi-factor authentication (MFA) means a security protocol that requires users to provide two or more forms of verification before accessing a system or data. MFA enhances security by combining something the user knows (e.g., a password), something the user has (e.g., a security token), and something the user is (e.g., biometric verification). In military and training environments, MFA ensures that only authorized personnel can access sensitive data or simulation platforms, protecting against unauthorized access and potential security breaches.

Holographic Table means a specialized holographic display system developed for visualizing complex 3D content. The table uses light field technology to create interactive, autostereoscopic 3D images that can be viewed from multiple angles without specialized glasses. This device is employed in training and simulation settings to facilitate collaborative planning and operational analysis by providing immersive and spatially accurate visualizations. The integration of haptic feedback and AI-driven content management enhances its utility in interactive training environments.

NTRUEncrypt means a public-key cryptographic algorithm based on lattice mathematics, designed to be resistant to quantum computer decryption. NTRUEncrypt relies on the hardness of lattice problems, such as finding the shortest vector in a high-dimensional lattice, to secure data. It is used for encrypting sensitive communications and data, ensuring confidentiality even in the presence of quantum computational capabilities that could break traditional encryption schemes.

Post-quantum encryption means cryptographic protocols designed to be secure against decryption by quantum computers. These methods are built on mathematical problems that are considered hard for both classical and quantum algorithms to solve, such as lattice-based problems like LWE and SIS. Post-quantum encryption is integrated into military and enterprise systems to ensure long-term data protection and maintain confidentiality in the face of evolving computational threats.

Quantum-resistant means the characteristic of cryptographic algorithms that remain secure even when faced with quantum computational power. Quantum-resistant algorithms are designed using mathematical structures, such as lattices, that cannot be efficiently solved by quantum algorithms like Shor's or Grover's. This property is essential for securing data in military and training applications where future-proof security measures are necessary to protect against quantum-based decryption techniques.

RSA (Rivest-Shamir-Adleman) means a public-key cryptosystem whose security relies on the difficulty of factoring large composite integers. RSA is used for key transport and digital signatures. Shor's algorithm allows efficient factoring on a sufficiently large quantum computer, so post-quantum alternatives are preferred for long-term security.

Shortest Vector Problem (SVP) means a computational problem that involves finding the shortest non-zero vector in a lattice. This problem is foundational in lattice-based cryptography, as its complexity underpins the security of several quantum-resistant algorithms. SVP is difficult for both classical and quantum computers to solve, making it integral to the development of cryptographic schemes that are resistant to quantum attacks.

Simulation means the use of computer models to replicate real-world processes, systems, or environments for training, analysis, or research. In military applications, simulations are used to recreate scenarios for mission planning, training exercises, and operational assessments. These digital environments can include AI-driven elements that respond dynamically to user interactions, enhancing the realism and effectiveness of the training experience.

Sphincs+ means a hash-based digital signature scheme designed to provide quantum-resistant security. Unlike lattice-based approaches, Sphincs+ uses cryptographic hash functions to generate secure, stateless digital signatures. This method offers long-term security by being resilient to both classical and quantum attacks. Sphincs+ is suitable for applications where data authenticity and integrity must be verifiable without vulnerability to future quantum decryption.

Transport Layer Security (TLS) means a cryptographic protocol that ensures the privacy and data integrity of communications over a computer network. TLS encrypts data during transmission, protecting it from interception and tampering. It is widely used in secure web communications and is an essential component in military and training data exchanges to maintain confidentiality. TLS is often paired with quantum-resistant measures to ensure security against emerging quantum threats.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

What is claimed is:

1. A computer-implemented method of training an artificial intelligence, AI, model to categorize data based on sensitivity levels, the method comprising:
   a. receiving, via one or more processors, a dataset comprising classified and publicly available data together with for respective data elements of the dataset, extrinsic parameters including metadata attributes stored in a permissioned distributed ledger, usage contexts, access patterns, or interrelations between datasets;
   b. obfuscating, via the one or more processors, the classified data by injecting synthetic noise or randomized errors to create a modified training set;
   c. training, via the one or more processors, an AI model on the modified training set, the publicly available data, and the extrinsic parameters to identify structural patterns and markers indicative of data sensitivity using the extrinsic parameters without relying on unobfuscated classified content;
   d. validating, via the one or more processors, the model's performance using a separate test dataset with known classifications; and
   e. generating, via the one or more processors, a sensitivity scoring model configured to accept the extrinsic parameters as inputs and to output a sensitivity score for a data element based at least in part on the extrinsic parameters and to map the score to an ordered set of relative sensitivity classification levels that includes at least a higher relative sensitivity classification level and a lower relative sensitivity classification level.

2. The method of claim 1, wherein the obfuscation step preserves the structure of the classified data while altering specific details to maintain confidentiality.

3. The method of claim 1, wherein the AI model is a neural network configured with layers optimized for pattern recognition in high-dimensional data.

4. The method of claim 1, wherein the validation step includes applying k-fold cross-validation to evaluate the accuracy and reliability of the trained model.

5. The method of claim 1, wherein the training incorporates reinforcement learning to adapt the model's categorization rules based on feedback from classification tests.

6. The method of claim 1, further comprising the step of refining the model by iteratively adding new training data as classification standards evolve.

7. The method of claim 1, wherein the sensitivity scoring model outputs a numerical score s in a bounded range and maps s to the ordered set of relative sensitivity classification levels using configurable thresholds, and wherein a level having a greater threshold is defined as a higher relative sensitivity classification level than a level having a lesser threshold.

8. A computer-implemented method of applying an artificial intelligence based sensitivity categorization model to military simulations, the method comprising:

a. receiving, via one or more processors, data elements from a military simulation, including operational scenarios and equipment specifications, together with, for respective ones of the data elements, extrinsic parameters including metadata attributes stored in a permissioned distributed ledger, usage contexts, access patterns, or interrelations between datasets;

b. processing, via the one or more processors, the data elements and the extrinsic parameter using a trained sensitivity categorization model to determine sensitivity levels that was trained on a modified training set comprising obfuscated classified data, publicly available data, and the extrinsic parameters and that is configured to determine sensitivity levels using the extrinsic parameters without relying on unobfuscated classified content;

c. classifying, via the one or more processors, each data element by assigning the sensitivity score based at least in part on the extrinsic parameters and mapping the score to the ordered set of relative sensitivity classification levels, including at least a higher relative sensitivity classification level and a lower relative sensitivity classification level;

d. protecting, via the one or more processors, the data elements assigned to the higher relative sensitivity classification level using a post quantum confidentiality mechanism comprising establishing a content encryption key with a key encapsulation mechanism and encrypting payloads using symmetric authenticated encryption, wherein selection of the post quantum confidentiality mechanism is based on the relative sensitivity classification level determined from the extrinsic parameters; and e. transmitting, via the one or more processors, the protected data to a secure storage system.

9. The method of claim 8, wherein the selection of protection is monotone non-decreasing with respect to the relative sensitivity classification level such that a data element at a higher relative sensitivity classification level receives protections that are at least as strong as protections applied to a data element at a lower relative sensitivity classification level.

10. The method of claim 8, wherein the military simulation data includes communication logs, mission plans, and asset allocation details.

11. The method of claim 8, wherein the post-quantum confidentiality mechanism comprises a key encapsulation mechanism selected from Kyber or a public-key encryption scheme selected from NTRUEncrypt.

12. The method of claim 8, further comprising applying a post-quantum digital signature scheme selected from CRYSTALS-Dilithium, Falcon, or SPHINCS+ to authenticate protected data elements and corresponding metadata.

13. The method of claim 8, wherein data elements assigned to the lower relative sensitivity classification level are protected using a reduced-rigor protection that omits the post quantum key establishment and applies symmetric authenticated encryption, thereby optimizing computational resources.

14. The method of claim 8, further comprising generating a report that logs categorized data elements and their corresponding encryption statuses.

15. A computer-implemented method of applying a trained sensitivity categorization model to mission and training data, the method comprising:

a. retrieving, via one or more processors, mission or training data together with, for respective data elements of the mission or training data, extrinsic parameters including metadata attributes stored in a permissioned distributed ledger, usage contexts, access patterns, or interrelations between datasets;

b. analyzing, via the one or more processors, the retrieved data using a trained sensitivity categorization model that was trained on a modified training set comprising obfuscated classified data, publicly available data, and the extrinsic parameters and that is configured to assign sensitivity scores using the extrinsic parameters without relying on unobfuscated classified content to assign a sensitivity score to each data element based at least in part on the extrinsic parameters, wherein selection of the post quantum confidentiality mechanism is based on the relative sensitivity classification level determined from the extrinsic parameters and to map each score to an ordered set of relative sensitivity classification levels;

c. categorizing, via the one or more processors, the data according to the ordered set, including at least a higher relative sensitivity classification level and a lower relative sensitivity classification level;

d. protecting, via the one or more processors, the data elements assigned to the higher relative sensitivity classification level using a post quantum confidentiality mechanism comprising establishing a content encryption key with a key encapsulation mechanism and encrypting payloads using symmetric authenticated encryption, wherein selection of the post quantum confidentiality mechanism is based on the relative sensitivity classification level determined from the extrinsic parameters; and e. storing, via the one or more processors, the protected data in a secured, access-controlled database.

16. The method of claim 15, wherein the ordered set of relative sensitivity classification levels comprises at least three levels including a lower level, an intermediate level, and a higher level, and wherein the intermediate level is protected using symmetric authenticated encryption with keys established by a classical key agreement.

17. The method of claim 15, wherein the mission data includes operational reports, training assessments, and personnel performance evaluations.

18. The method of claim 15, further comprising auditing, via the one or more processors, the stored data periodically to ensure ongoing adherence to classification standards.

19. The method of claim 15, wherein real-time processing is implemented to categorize new mission and training data as it is generated or received.

20. The method of claim 15, wherein updates to the sensitivity categorization model are propagated automatically across the system to maintain consistency in data classification.

\* \* \* \* \*